United States Patent [19]

Sharpe et al.

[11] 4,077,921
[45] Mar. 7, 1978

[54] SPRAYABLE LOW DENSITY ABLATOR AND APPLICATION PROCESS

[75] Inventors: Max H. Sharpe; William E. Hill; William G. Simpson; James M. Carter; Edwin L. Brown; Harry M. King; Paul H. Schuerer, all of Huntsville; David D. Webb, Lacy Spring, all of Ala.

[73] Assignee: The United States of America as represented by the Administrator of the National Aeronautics and Space Administration, Washington, D.C.

[21] Appl. No.: 760,809

[22] Filed: Jan. 19, 1977

[51] Int. Cl.² ............................................. C08J 9/22
[52] U.S. Cl. .......................... 260/2.5 B; 260/2.5 BE; 260/2.5 AP; 260/2.5 EP; 260/2.5 AK; 260/2.5 FP; 260/37 EP; 260/29.1 R; 427/427
[58] Field of Search .................. 260/2.5 BE, 2.5 AP, 260/2.5 EP, 2.5 AK, 2.5 B, 830 P, 37 EP, 2.5 FP

[56] References Cited

U.S. PATENT DOCUMENTS

| 3,317,455 | 5/1967 | Blome et al. ............... 260/2.5 B |
| 3,755,223 | 8/1973 | Engel ............................. 260/2.5 EP |

Primary Examiner—Morton Foelak
Attorney, Agent, or Firm—J. H. Beumer; J. R. Manning; L. D. Wofford, Jr.

[57] ABSTRACT

A sprayable, low density ablative composition consisting essentially of:

a. 100 parts by weight of a mixture of 25-65% by weight of phenolic microballoons,
  0-20% by weight of glass microballoons,
  4-10% by weight of glass fibers,
  25-45% by weight of an epoxy-modified polyurethane resin,
  2-4% by weight of a bentonite dispersing aid and
  1-2% by weight of an alcohol activator for the bentonite;

b. 1-10 parts by weight of an aromatic amine curing agent; and c. 200-400 parts by weight of a solvent.

10 Claims, 2 Drawing Figures

SPRAYABLE LOW DENSITY ABLATOR AND APPLICATION PROCESS

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

This invention relates to a lightweight, low cost sprayable ablator composition.

Ablative materials heretofore used as heat shields in space vehicles adapted for being subjected to high velocity, high temperature conditions during re-entry into the earth's atmosphere have been fabricated either in the form of sheets or blocks of material, which must be conformed to the shape of the surface being covered and adhered thereto.

A disadvantage of such systems is the difficulty of removing the ablative material, e.g., sheets of cork, from the space vehicle after re-entry, owing to the adhesion of pieces thereof to the surface of the vehicle.

Another disadvantage of known ablator materials and systems is the difficulty encountered in fashioning a uniform covering, presenting a smooth surface to the atmosphere during flight and re-entry.

A further disadvantage of known systems is the great expenditure of time required to fabricate a covering piece-by piece on the outside of the space vehicle. Thus-fabricated coverings usually require lengthy cure cycles for production of an even, adherent ablative covering and frequently require a vacuum bag cure.

Thus, there is a continuing need for ablator compositions which 1. conform readily to the space vehicle being coated,
2. are readily removable from the space vehicle during renovation subsequent to re-entry into the earth's atmosshere,
3. can be applied in a smooth, uniform way to any desired thickness,
4. are curable under ambient conditions or without requiring expensive equipment for the cure cycle, and
5. are inexpensive.

SUMMARY OF THE INVENTION

In a composition aspect, this invention relates to a sprayable low density ablator consisting essentially of:

(a) 100 parts by weight of a mixture of 25–65% by weight of phenolic microballoons,
0–20% by weight of glass microballoons,
4–10% by weight of glass fibers,
25–45% by weight of an epoxy-modified polyurethane resin,
2–4% by weight of a bentonite dispersing aid and
1–2% by weight of an alcohol activator for the bentonite;

(b) 1–10 parts by weight of an aromatic amine curing agent; and (c) 200–400 parts by weight of a solvent.

In a structural aspect, this invention relates, in a space vehicle adapted to be subjected to high velocity, high temperature conditions during re-entry into the earth's atmosphere from a mission in space and having a protective heat shield on the exterior of the vehicle to dissipate and insulate against heat conditions during re-entry of the space vehicle to the improvement wherein the heat shield consists of:

(a) a coating of a suitable conventional epoxy paint on the exterior surface of said vehicle and (b) a partially cured, tacky coating of a coalescing agent on the coating of epoxy paint wherein the coalescing agent is an epoxy-modified polyurethane derived from the same composition as MXSA binder Crest 7344 and utilizes the same curing agent as Crest 7344 (Shell Z) and the epoxy-modifier is bisphenol A diglycidyl ether, ethylene glycol diglycidyl ether or glycerol diglycidyl ether or a mixture thereof; and, for each 100 parts by weight of the epoxy-modified polyurethane, 13–15 parts by weight of an aromatic amine curing agent for said resin; and (c) over the coating of the partially cured coalescing agent, a coating of cured dried, low density, ablative composition described above.

Accordingly, it is an object of this invention to provide a sprayable, low cost, readily curable ablative coating composition, which uniformly and smoothly adheres to the surface of a space vehicle and which is readily stripped from the vehicle after a mission in space.

It is a further object of the invention to provide a space vehicle coated with the cured, sprayable ablative coating composition.

These and other objects and advantages of the invention will become apparent upon reference to the following specification, attendant claims, and drawing.

DESCRIPTION OF A PREFERRED EMBODIMENT

Figure 1:
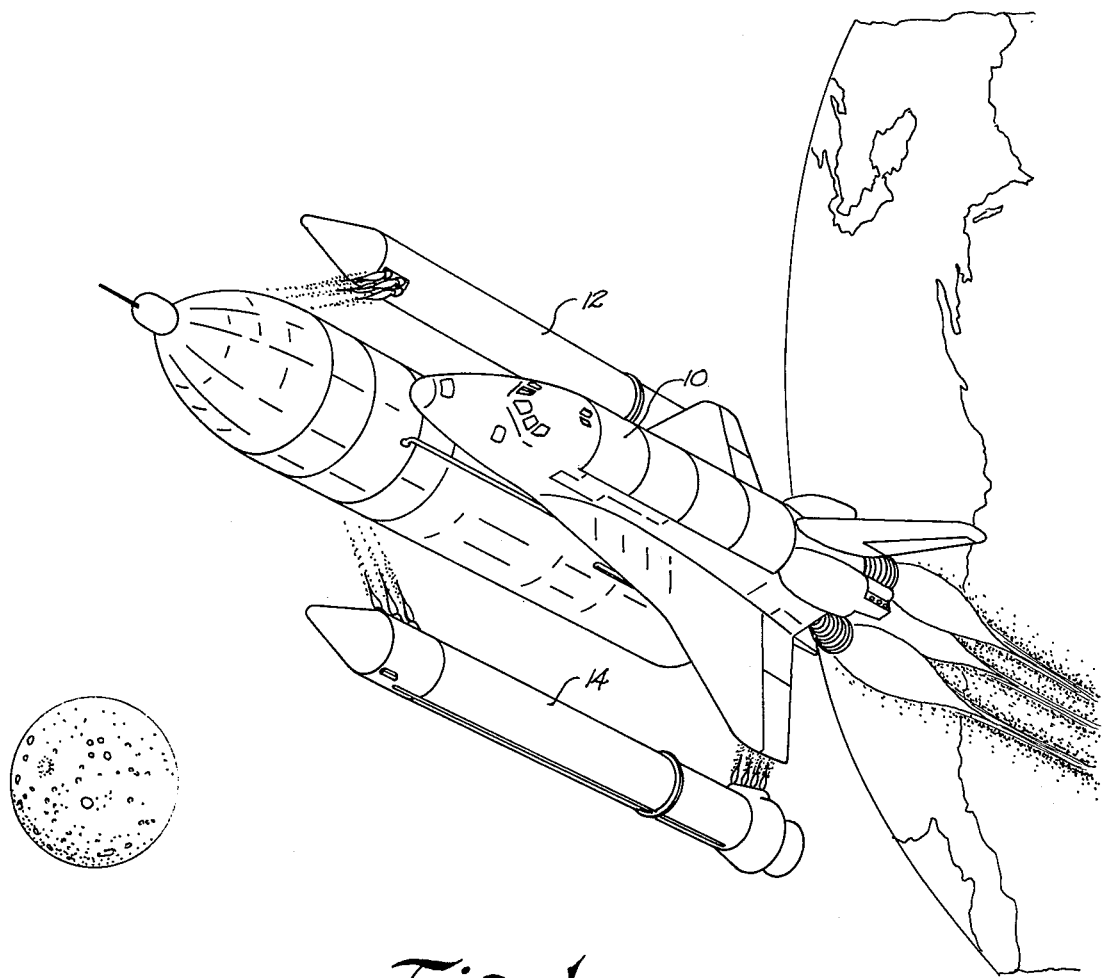
In FIG. 1 is illustrated a space shuttle being propelled into outer space.

Phenolic microballoons useful in the practice of this invention are expanded spheres of phenol-formaldehyde resin, having a particle diameter size from 0.0002 to 0.005 inch and a density of 6.5 lb/ft maximum. On an average, the microballoons are of particle size diameter of 0.0017 inch. Microballoons of this type are described in Union Carbide Corp., Product Application Bulletin, *Bakelite Phenolic Microballoons* and are available from Union Carbide Corporation under the product description Bakelite Phenolic Balloons, BJO-0930.

The phenolic microballoons will make up 25–65% by weight of the mixture (a), above, preferably 35–40% by weight thereof.

The phenolic microballoons function as a low density filler in the ablative composition, but during the ablation process of re-entry, the microballoons are thought to generate hydrocarbon and other gaseous products, which absorb heat energy as they percolate through the char. The phenolic microballoons are also thought to provide the carbonaceous char skeleton, which is essential for the maintenance of a stable char layer and high ablation efficiency.

Glass microballoons useful in accordance with the invention are hollow discrete spheres of synthetic, fused, water-insoluble alkali metal silicate-based glass, e.g., those described in U.S. Pat. Nos. 2,978,340 and 3,030,215. The microspheres will have a diameter within the range 5–5000 microns, preferably 10–750 microns, and a density of 0.30–0.35 g/cc, preferably 0.31–0.34 g/cc.

The mixture (a) can contain 0–20% by weight of the glass microballoons, preferably 10–15% by weight thereof.

Typical of the commercially available glass microspheres which can be used are those identified as Emerson and Cuming IG 25 (Emerson & Cuming, 59 Walpole St., Canton, Mass.) and SI Eccospheres, also a product of Emerson and Cuming.

Glass fibers used as reinforcement for the ablative compositions of the invention can vary in size from 1/16–¼ inch in length, and preferably consist of combinations of relatively longer chopped fibers and relatively shorter milled fibers. Particularly preferred is a mixture of fibers 1/16–¼ inch in length.

Each of the above lengths of glass fibers is made up of strands consisting of 204 filaments, each filament having a nominal diameter of 0.00051 inch. The 1/16-inch long fibers are produced by a milling operation during which the strand is broken up, to a large degree, into the individual filaments. The ¼-inch long fibers are produced by a chopping operation in which the strand, to a large degree, remains intact. It is not feasible, however, to predict the number of filaments in the strands after they have been cut to size.

The glass fibers are preferably pre-treated with an aminosilane coupling agent of the formula $[H_2N(CH_2)_n]_ySiX_z$ wherein the sum of $y$ and $z$ is 4, $n$ is an integer from 2 to 12 and X is a hydrolyzable group, e.g., halogen, hydroxy, or alkoxy of up to 4 carbon atoms. Exemplary coupling agents include, but are not limited to, $v$-aminopropyl(trimethoxy)silane and $v$-aminopropyl-(triethoxy)silane. The fibers are purchased with a standard commercial silane surface treatment.

The glass fibers will constitute 4–8% by weight of the mixture (a), preferably 3–7% by weight. An especially preferred distribution is 1–2% by weight of about ¼ inch chopped glass fibers and 2–5% by weight of about 1/16 inch milled glass fibers.

"Epoxy-modified polyurethane," as used in the specification and claims means a modified polyether-polyurethane, based on a polyether, e.g., (poly(tetramethylene glycol) ether, poly(trimethylene glycol) ether, poly(ethylene glycol ether) and higher homologs thereof, including branched ethers, e.g., poly(propylene glycol) ether. Of the foregoing poly(tetramethylene glycol) ether and poly(trimethylene glycol ether) are preferred.

The polyether segment is reacted with a diisocyanate, e.g., p-phenylene diisocyanate, m-phenylene diisocyanate, 2,4-toluene diisocyanate and isomers thereof, methylenebis(phenyl isocyanate), methylenebis(chlorophenyl isocyanate), and methylenebis(tolyl isocyanate) to produce an isocyanate-terminated prepolymer or oligomer. The toluene diisocyanates are preferred.

The isocyanate-terminated oligomer is reacted with a mixture of a diepoxy compound, e.g., bisphenol A diglycidyl ether, ethylene glycol diglycidyl ether or diethylene glycol diglycidyl ether; and a hydroxy-epoxy compound, e.g., glycerol diglycidyl ether, butanetriol diglycidyl ether or pentaerythritol diglycidyl ether. Of the diepoxy compounds, bisphenol A diglycidyl ether is preferred and of the hydroxy-epoxy compounds, glycerol diglycidyl ether.

Typical of commercially available materials useful as the epoxy-modified polyurethane is Crest 7344, obtainable from Crest Products. Co., 3010 Halladay Street, Santa Ana, California, 92705.

The epoxy-modified polyurethane comprises 25–65% by weight of the mixture (a), above, preferably 30–40% by weight thereof.

Bentonite or wilkinite is a colloidal native hydrated aluminum silicate or clay, which consists mainly of montmorillonite, $Al_2O_3 \cdot 4SiO_2 \cdot H_2O$. Bentonite is available, for example, from National Lead Industries under the name of bentone 27.

The bentonite is activated with an alkanol (alcohol) activator, preferably an alkanol of up to 8 carbon atoms. Ethanol is most preferred. The alkanol is added during the preparation of mixture (a).

The amount of bentonite is 2–4% by weight of mixture (a) and the amount of alcohol activator 1–2% by weight.

The aromatic amine curing can be any aromatic diamine, e.g., phenylene diamine, tolylene diamine, methylene-di(aniline), xylene diamine, or mixtures thereof of the amines, phenylene diamine, preferably the meta isomer, and methylene-di(aniline), preferably the para isomer, are preferred. Most preferred is an eutectic mixture of m-phenylene diamine and para-methylenedi (aniline), available commercially as Crest 7119 or Shell Z catalyst (Shell Chemical Co.).

The amount of aromatic amine curing agent is from 1–10 parts by weight per hundred parts of mixture (a), preferably 2–7 parts by weight. Preferably about 13–15 parts by weight of aromatic amine curing agent are used per 100 parts by epoxy-modified polyurethane resin.

The solvent for the composition is any material which will dissolve or suspend the combination of mixture (a) and aromatic amine curing agent (b) and which is inert with respect thereto.

The amount of solvent is 200–400 parts by weight per hundred of mixture (a), preferably 275–325 parts by weight thereof.

Solvents which can be used are preferably non-flammable and include, for example, methylene chloride, chloroform, the various di-, tri-, and tetrachloroethanes, ethylene dichloride, trichloroethylene and tetrachloroethylene.

The solvent controls the viscosity of the mixture before application and promotes wetting between individual layers of material and adhesion of the composition to the primed substrate. In order to maintain a proper solvent level in the material being deposited by spraying, a mixture of a relatively volatile and a relatively non-volatile solvent is conveniently used. Particularly preferred solvents are methylene chloride or perchloroethylene, preferably a mixture thereof in a weight ratio from 1 : 2 to 2 : 1.

In FIG. 1 is shown a space shuttle 10 being propelled into outer space. The cured ablative composition covers portions of the small solid fuel rockets, indicated by 12 and 14.

Figure 2:
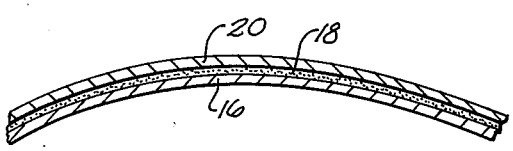
In FIG. 2 is shown the improved ablative structure of the invention.

In detail, shown in FIG. 2, the surface or skin of the space vehicle is indicated by the numeral 16. Adjacent to this is a coalescing or adhering layer 18 and atop this the cured ablative coating composition 20.

The exterior top coat of the insulating system will be a sprayable butadiene rubber composition, suspended in a perchloroethylene solvent and applied directly onto the cured ablative material.

Different solvent flow within the spray insulation during the time between spray application and total evaporation of solvent results in some degree of resin starvation near the substrate surface, with resultant weakening of the bond between substrate and insulation layer. Therefore, a coat of adhesive (coalescing agent) must be applied by spraying to the substrate and partially cured to a tacky state immediately prior to application of the insulation. The adhesive used, the same epoxy-modified polyurethane resin that serves as a binder for the insulation system, is thinned by solvent addition to spraying consistency for this operation. The cured coalescing agent should preferably be 11 ± 1 mils thick.

The coalescing or adhering agent applied between the epoxy-coated skin of the space vehicle and the ablative composition thus is the epoxy-modified polyurethane resin used in the ablative coating composition, along with 13-15 parts of the aromatic amine curing agent used therewith and 100 parts of solvent per hundred parts by weight of polyurethane resin. Preferred resins, curing agents and solvents are the same as recited above.

The coalescing or adhering agent is preferably applied by spraying.

The thermal environment to which the space vehicle will be exposed in flight requires that a portion of the surface be covered with a high temperature insulation, which in turn is painted. The insulation system will be composed of a hybrid that is made up of a sprayable, room temperature curing, highly filled, epoxy-modified polyurethane system applied directly in some areas and bonded on cork used in other areas. Following application of the insulating materials to the substrate and any required surface finishing operations, a spray-on seal coat and/or paint will be applied to the surface.

The sprayable ablative composition, hereafter referred to as MXSA can be applied to the required areas using automated techniques. The uncured insulation composition consists of a very viscous, highly filled, room temperature curing system which can be sprayed through commercially available spray guns and pumps. After being applied to the substrate, onto which a coalescing agent has been applied, the insulation is cured at an elevated temperature. Finishing operations and application of an exterior coating follow. An elevated temperature cure is preferably employed to reduce the overall processing time, although the system will completely cure at room temperature.

The composition thus applied performs satisfactorily in relatively low heating rate environments, such as those of less than 15 B.T.U./ft.$^2$ sec.

The material can be applied in single or multiple passes to thicknesses of upwards of 0.5 inch, without the need for external reinforcement to inhibit slumping during cure.

Among factors thought to contribute to the unique attributes of the composition and the ease with which it is handled and applied are:

(1) use of glass fibers of varying lengths prevents clogging of the spray apparatus owing to matting of the glass fibers;

(2) use of the bentonite suspending or gelling agent to inhibit rapid stratification and separation of the mixed formulation during the spray operation;

(3) use of a non-flammable binary solvent system of which the evaporation rate is controlled by varying the ratio of high to low boiling components to allow for adjustment through a range of operating temperatures.

DESCRIPTION OF PREFERRED EMBODIMENTS

In a preferred embodiment, the composition of this invention is that wherein the phenolic microballoons are from phenolformaldehyde resin, and have a sphere diameter distribution of 0.0002 - 0.005 inch mesh and a density of 6.5 lb. per ft$^3$ maximum; the glass microballoons are of water-insoluble alkali-metal silicate based glass of 10-750 microns in sphere diameter and a density of 0.30 - 0.35 g per cc; the glass fibers are a mixture of fibers as described above in more detail, and are 1/16-¼ inch in length and wherein the mixture (a) further contains an aminosilane coupling agent, or said fibers are pretreated with the aminosilane agent, and the epoxy-modifier is bisphenol A diglycidyl ether, ethylene glycol diglycidyl ether or glycerol diglycidyl ether or a mixture thereof; the activator for said bentonite is ethanol; the aromatic amine curing agent is m-phenylenediamine or p-methylenedianiline or a mixture thereof; and the solvent is methylene chloride or perchloroethylene or a mixture thereof.

Most preferably, the mixture (a) consists essentially of
35-40% by weight of said phenolic microballoons,
10-15% by weight of said glass microballoons,
1-2% by weight of ¼ inch chopped glass fibers,
2-5% by weight of 1/16 inch milled glass fibers; and
30-40% by weight of said epoxy-modified polyurethane resin;

and said composition further contains 2-7 parts by weight of a mixture of m-phenylene diamine and p-methylenedianiline and 275-325 parts by weight of 1 : 2 to 2 : 1 mixture by volume of methylene chloride and perchloroethylene.

In related structural aspects, those structures derived from the preferred compositions are most preferred.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

(a) MXSA material formulation

A typical MXSA formulation for approximately 5 gallons is illustrated below:

| | |
|---|---|
| B.J.O. Microballoons | 2700 Grams |
| Glass Eccospheres | 900 Grams |
| 1/4" Long Chopped Glass Fibers | 90 Grams |
| 1/16" Long Milled Glass Fibers | 225 Grams |
| 7344 Resin | 2625 Grams |
| 7119 Catalyst | 368 Grams |
| Bentone | 246 Grams |
| Alcohol | 124 Grams |
| Methylene Chloride (Approx.) | 11.8 Quarts |
| Perchloroethylylene (Approx.) | 4 Quarts |

(b) MXSA mixing procedure

The required amount of each component is measured before beginning the mixing operation. B.J.O. Microballoons are charged to mixing container with enough solvent to produce a blendable but not liquid mass. Glass Microballoons (or S.I. Eccospheres) are added with additional solvent to produce a blendable but not liquid mass.

In a separate container, catalyzed resin is dissolved in solvent at a ratio of approximately 1 part resin to 1 part solvent and then is added to the mixing container.

Chopped fibers are sprinkled slowly into the mixture with addition of enough solvent to maintain blendable mass. Milled fibers are sprinkled slowly into the mixture along with enough solvent to maintain a blendable mass. Bentone 27 is added, followed by ethyl alcohol and sufficient solvent for ease of blending. The remainder of the solvent is added to yield a sprayable formulation.

EXAMPLE 2

(a) Substrate Preparation

The substrate surface (epoxy paint) which will receive coalescing agent and ablative coating composition is prepared as follows:

(1) Wipe the surface with methylene chloride or perchloroethylene as required to remove shop oils or other contaminants.

(2) Lightly sand surface of epoxy paint to break glossy surface (320 grit).

(3) Wipe surface to remove sanding dust.

(b) Preparation of Coalescing Agent (1) Mix Crest 7344 resin with 7119 curing agent in the ratio 100 parts resin to 14 parts curing agent by weight.

(2) Dilute catalyzed resin with methylene chloride 1:1 by weight.

(c) Application of Coalescing Agent

Weigh out unfilled resin system (100 parts) and catalyst (14 parts) and mix thoroughly. Thin to spraying consistency using 1 to 1 parts by weight of methylene chloride as a solvent.

Pour into a standard Gel Coat type spray gun and apply 10–12 mil of coalescing agent. To obtain a coating of this thickness, a thixotropic material may be required.

(d) Curing Procedure

Place assembly in a uniformly heated oven and cure approximately 30–60 minutes at 135° ± 10° F. to a "B" stage tacky condition.

Visual inspection of the coalescing agent during cure is required to prevent material separation due to surface tension. If this condition occurs, respread the resin using a coarse brush before the "B" stage cure is reached.

(e) Preparation of the Ablative Coating

The following formulation is prepared as in Example 1:

| Material | Weight Percent |
| --- | --- |
| Phenolic Microballoons | 37.8 |
| Glass Microballoons | 12.6 |
| 1/4" Chopped Glass Fibers | 1.3 |
| 1/16" Milled Glass Fibers | 3.1 |
| Whitaker Research and Development, Urethane/Epoxy Resin (WRD 397) | 36.7 |
| Shell Z Catalyst | 5.1 |
| Bentone | 3.4 |
| | 100.0 |

To this formulation of materials, the following solvents are added:

| | |
| --- | --- |
| Alcohol | 1.7 parts per hundred |
| Methylene Chloride | 150 |
| Perchloroethylene | 150 |

(f) Application of the Ablative Coating

The MXSA application equipment consists of a material delivery system, a spray system and associated tooling. The material delivery system receives the premixed material from the mixers and supplies the material under pressure to the spray system, where it is atomized and sprayed onto the surface of the workpiece.

The pump used in the material delivery system is positive feed worm gear type pump, or equivalent, capable of an output of approximately 3 to 6 gallon/minute at a pressure of TBD psi depending on nozzle configuration and atomizing air pressure.

Means to monitor the viscosity of the material being sprayed is incorporated in the system and, when required, means for introducing additional solvent to maintain the required viscosity for spraying.

The material is sprayed from a Binks Model 33 Spray Gun or equivalent. For work requiring a hand-held gun, the Binks 7E2 Spray Gun or equivalent can be used.

For automatic application, the spray gun is attached to an oscillator which in turn is affixed to a tool post. This permits vertical travel of the oscillator/spray gun combination at a controlled rate during spray operation.

The workpiece is positioned on, and secured to, a turntable which permits rotation of the workpiece at a controlled rate during the application of the composition. The rotational speed of the turntable, the vertical speed of the spray gun and the output of the spray equipment are synchronized so that the insulation deposited is of a uniform required thickness.

(g) Curing of the Insulation

The MXSA curing operation is done in two stages, a pre-cure portion and a final cure portion.

(1) Pre-cure cycle

The pre-cure cycle is completed on the turntable to allow for bulk solvent evaporation and provide for partial resin polymerization to assure integrity of the coating during subsequent handling operations.

The pre-cure process is:

(1) Maintain room exhaust system operation.
(2) Apply heat by air circulation internally 100 ± 10° F. to assist in solvent evaporation. If internal heating is impractical, external heating may be utilized.
(3) Maintain heating for 6–8 hours.
(4) Cool to facilitate handling.

(2) Final cure cycle

The secondary final cure cycle is used to accelerate final cure to meet facility scheduling requirements and to condition the insulation for subsequent finishing operations.

The final cure process is as follows:

(1) Move hardware to curing facility.
(2) Cure the coated vehicle in oven at 135°– 10° F. for 4 hours.
(3) Remove hardware from cure facility and transport to surface finishing area.

The thus-cured insulation has an as-sprayed surface that exhibits a fibrous overspray (haystack) and/or a coarse texture which may require surface finish operations, such as removal of the overspray with stiff brushes.

The surface of the insulation is abraded to the required contour and finish after which it is vacuumed to remove all traces of dust prior to application of external sealer and paint.

The above material formulation, properly applied by the spray process, yields a density of approximately 18 pounds per cubic foot and has a flatwise tensile strength in excess of 200 pounds per square inch. It has demonstrated excellent ablative performance in high speed wind tunnel testing at heat fluxes up to 13 BTU/ft -sec and in infrared lamp heating tests, at a similar heat flux. These tests were conducted with acoustically driven substrate vibration simulating the highest levels expected during the Space Shuttle Solid Rocket Motor launch and ascent.

EXAMPLE 3

A major operation performed immediately after recovery of space vehicle units from the ocean is removal of the charred, salt water laden MXSA and cork. Substrate paint refurbishment almost must preceed application of new insulation.

The major portion of charred insulation is removed by high pressure water jet impingement. Chemical strippers are applied to areas of the vehicle inaccessible to water jet penetration.

All demountable pressure sensitive items are removed from the major structural elements and major elements are placed on a rotating fixture for maximum accessibility during the stripping operation. The coating is removed by high pressure water application of a Hydrolaser (5000 to 7000 psi or greater) to all accessible areas.

Utmost caution is exercised in operation of the Hydrolaser, because high pressure water can have a very deleterious effect on both people and sensitive hardware. The operators should be protected with adequate safety clothing and equipment.

Small areas of the insulation which are not readily accessible with the water laser are removed using chemical stripping compounds (Turco 6015 or equivalent). Contiguous areas of insulation to be treated with chemical stripper shall be completely coated with stripping compound. After the required waiting period, the softened insulation layer is manually removed.

A thorough water rinse follows the stripping operation.

Residual insulation and/or coalescing agent is removed by manual sanding and the substrate surface is inspected after the operation to identify paint damage or structural damage.

Unless there is structural damage, the vehicle is refurbished in accordance with Example 2.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A sprayable low density ablator composition consisting essentially of:
    (a) 100 parts by weight of a mixture of
        25–65% by weight of phenol formaldehyde microballoons,
        0–20% by weight of glass microballoons,
        4–10% by weight of glass fibers,
        25–45%% by weight of an epoxy-modified polyurethane resin wherein said polyurethane is produced by the reaction of 2,4-toluene diisocyanate and polytetramethylene glycol ether and epoxy modifier is bisphenol A diglycidyl ether, ethylene glycol digycidyl ether or glycerol diglycidyl ether or a mixture thereof,
        2–4% by weight of a bentonite dispersing aid and
        1–2% by weight of an alcohol activator for the bentonite;
    (b) 1–10 parts by weight of an aromatic amine curing agent; and
    (c) 200–400 parts by weight of a solvent.

2. The composition of claim 1, wherein the phenolic microballoons are from phenolformaldehyde resin, having a sphere diameter distribution of 0.0002–0.005 inch and a density of 6.5 lb per ft$^3$.

3. The composition of claim 1, wherein the glass microballoons are of water-insoluble alkali-metal silicate-based glass of 10–750 microns in sphere diameter and a density of 0.3g per cc.

4. The composition of claim 1, wherein the glass fibers are a mixture of fibers having a diameter of approximately 0.00051 inch and 1/16–¼ inch in length and wherein said fibers are pretreated with the aminosilane agent.

5. The composition of claim 1, wherein the epoxy-modified polyurethane is derived from 2,4-toluenediisocyanate and poly(tetramethylene glycol)ether and the epoxy-modifier bisphenol-A dicylycidyl ether.

6. The composition of claim 1, wherein the activator for said bentonite is ethanol.

7. The composition of claim 1, wherein the aromatic amine curing agent is m-phenylenediamine or p-methylenedianiline or a mixture thereof.

8. The composition of claim 1, wherein the solvent is methylene chloride or perchloroethylene or a mixture thereof.

9. The composition of claim 1, wherein the phenol formaldehyde microballoons are from phenolformaldehyde resin, have a sphere diameter distribution of 0.0002–0.005 inch and a density of 6.5 lb per cc;
    the glass microballoons are of water-insoluble alkali-metal silicate-based glass of 10–750 microns in sphere diameter and a density of 0.3 g per cc;
    the glass fibers are a mixture of fibers of approximately 1/16 – ¼ inch in length and wherein said fibers are pretreated with the aminosilane agent;
    the epoxy-modified polyurethane is derived from a polyether (such as poly(tetramethylene glycol)ether) and a diisocyanate, such as 2,4-toluenediisocyanate and the epoxy-modifier is bisphenol A diglycidyl ether, ethylene glycol diglycidyl ether or glycerol diglycidyl ether or a mixture thereof;
    the activator for said bentonite is ethanol;
    the aromatic amine curing agent is m-phenylenediamine or p-methylenedianiline or a mixture thereof; and
    the solvent is methylene chloride or perchloroethylene or a mixture thereof.

10. The composition of claim 9, wherein the mixture (a) consists essentially of

35–40% by weight of said phenol formaldehyde microballoons,
10–15% by weight of said glass microballoons,
1–2% by weight of ¼ inch chopped glass fibers,
2–5% by weight of 1/16 inch milled glass fibers; and
30–40% by weight of said epoxy-modified polyurethane resin wherein said polyurethane is produced by the reaction of 2,4-toluene diisocyanate and polytetramethylene glycol ether and epoxy modifier is bisphenol A diglycidyl ether, ethylene glycol digycidyl ether or glycerol diglycidyl ether or a mixture thereof;

and said composition further contains 2–7 parts by weight of a mixture of m-phenylene diamine and p-methylenedianiline and 274–325 parts by weight of a 1:2 to 2:1 mixture by volume of methylene chloride and perchloroethylene.

* * * * *